United States Patent [19]

Metcalfe et al.

[11] 4,061,359
[45] Dec. 6, 1977

[54] VEHICLES

[75] Inventors: Edward Geoffrey Metcalfe; Walter Henry Ward, both of Vereeniging, South Africa

[73] Assignee: Massey-Ferguson Services N.V., Curacao, Netherlands Antilles

[21] Appl. No.: 678,177

[22] Filed: Apr. 19, 1976

[30] Foreign Application Priority Data

Apr. 18, 1975 United Kingdom ............... 16225/75

[51] Int. Cl.² ............................................. B62D 21/14
[52] U.S. Cl. .................................... 280/638; 214/390; 280/656
[58] Field of Search ................ 280/638, 656; 214/390, 214/394

[56] References Cited

U.S. PATENT DOCUMENTS

| 2,706,881 | 4/1955 | McDonald | 280/656 |
| 3,468,440 | 9/1969 | Poole | 214/390 |
| 3,792,789 | 2/1974 | Oehler | 214/390 |
| 3,899,037 | 8/1975 | Yuker | 280/638 |

Primary Examiner—Robert R. Song
Attorney, Agent, or Firm—Robert L. Farris

[57] ABSTRACT

A load carrying vehicle is provided with a pair of wheel assemblies which are swingable relative to the frame to vary the width of the track. The wheel assemblies are supported on torsion bars which extend along the frame and may be rotated by a hydraulic cylinder. The torsion bars also provide springing for the vehicle.

9 Claims, 4 Drawing Figures

VEHICLES

This invention relates to vehicles suitable for transporting loads and in particular to vehicles adapted to handle containers.

Such a vehicle is shown in U.K. Pat. No. 1107763 which discloses a trailer having a U shaped lattice frame which is connected at one end to a tractor unit and is supported at the other end by a pair of wheels. The U shaped frame is dimensioned so as to accommodate a standard container within the U and a lifting device is provided to raise and support the container clear of the ground. The container is positioned by reversing the frame toward the container so that the legs of the U are on either side of the container. The lifting device may then be operated. It will be apparent that the track of the wheels supporting the frame must be greater than the width of the container to allow it to pass into the frame. However, with such a track, the vehicle may be prohibited from using certain public highways and so the utility of the vehicle is affected.

It is an object of the present invention to obviate or mitigate the above disadvantages.

According to the present invention there is provided a vehicle adapted to support a load and comprising a frame and a pair of transversely disposed ground engaging wheel assemblies, each said wheel assembly being swingable relative to said frame between at least two positions to change the transverse distance between said assemblies.

Preferably each of said wheel assemblies is connected to said frame by a pair of parallel links pivotally mounted to said frame and power means are provided to pivot said links.

Preferably also said frame is U shaped, and one said wheel assembly is connected to a respective one of the legs of the U at the extreme end thereof, said power means being located adjacent the base of the U and connected to said wheel assemblies by spring means capable of carrying torque arising from the load carried by the wheels in both of the said positions.

An embodiment of the invention will now be described by way of example only with reference to the accompanying drawings in which.

Figure 1:
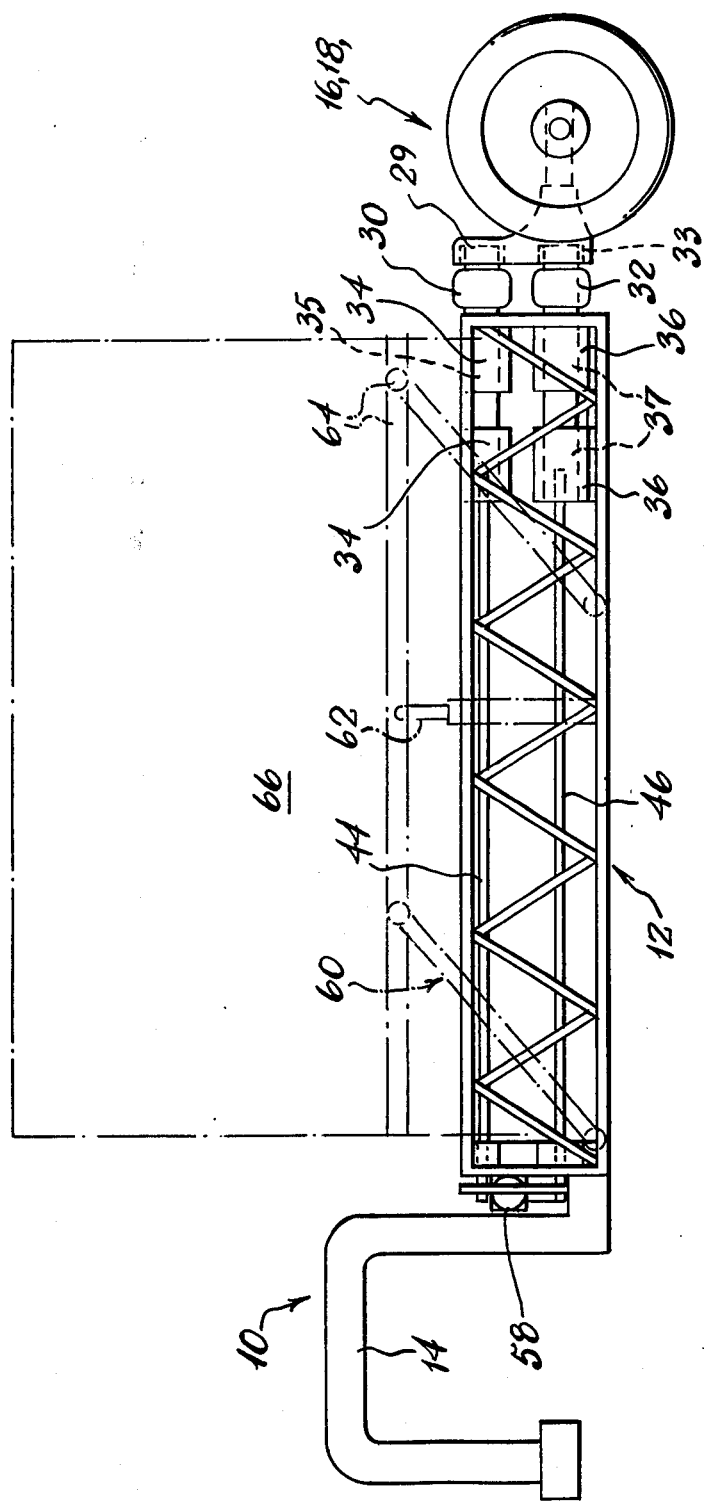
FIG. 1 is a side elevation of a vehicle.

Referring now to FIG. 1, a load carrying vehicle 10 comprises a U shaped lattice frame 12 and a goose neck towing connection 14 rigidly attached to the frame 12. The connection 14 may be attached to a tractor vehicle as shown in U.K. Pat. No. 823584. As can best be seen in FIG. 2, a wheel assembly 16, 18 is connected, to each leg 20, 22 of the frame 12 at the extreme end thereof.

Each wheel assembly 16, 18 comprises two wheels 24 and 25 mounted on a cross shaft 27. The cross shaft 27 itself is carried on a tubular member 28 which protrudes forwardly and is carried by two bearings (not shown) inside a wheel support bracket 29. The wheel support bracket 29 is carried at top and bottom locations on Z shaped crank members 30 and 32 which are pivoted at one end on bearing means 31 and 33 respectively and at the other end on bearing means 35 and 37 respectively. The bearing means 31 and 33 are mounted in the bracket 29 and the bearing means 35 and 37 are mounted in bearing blocks 34 and 36 respectively the latter being fixed at top and bottom respectively to the frame 12. The bearing means 31, 33, 35 and 37 must be collectively capable of transmitting both shear force and bending moment arising from the load on the vehicle to the wheels. The ends of the crank members 30 and 32 carried in the bearing means 35 and 37 receive, by a torque transmitting connection such as a key, the ends of torsion bars 44 and 46 respectively. These latter extend the length of the frame 12 and are supported at forward bearings 48 which are mounted on frame 12.

Figure 4:
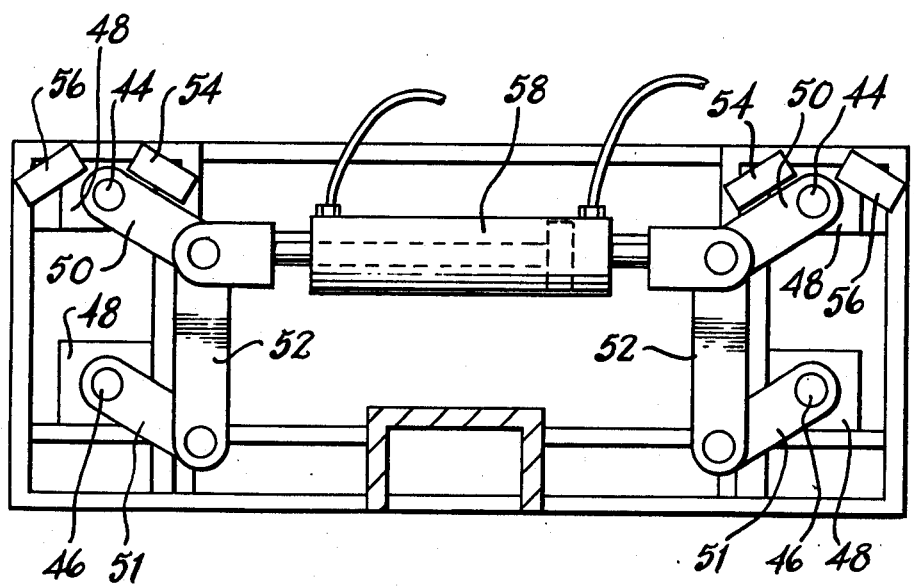
FIG. 4 is a view on the line IV—IV of FIG. 2.

As can best be seen in FIG. 4 the end of the torsion bars 44, 46 adjacent the base of the frame 12 are rigidly connected respectively to links 50, 51 which are interconnected by a slave link 52. The upper link 50 rests against one of a pair of stops 54, 56 and a double acting hydraulic ram 58 is connected between the links 50.

A lifting device 60 comprising a parallel linkage 64 is mounted within the frame 12 and may be raised by a hydraulic ram 62. The upper link 65 of the linkage 64 is arranged to engage a container 66 and support it clear of the ground for transport purposes.

Figure 2:
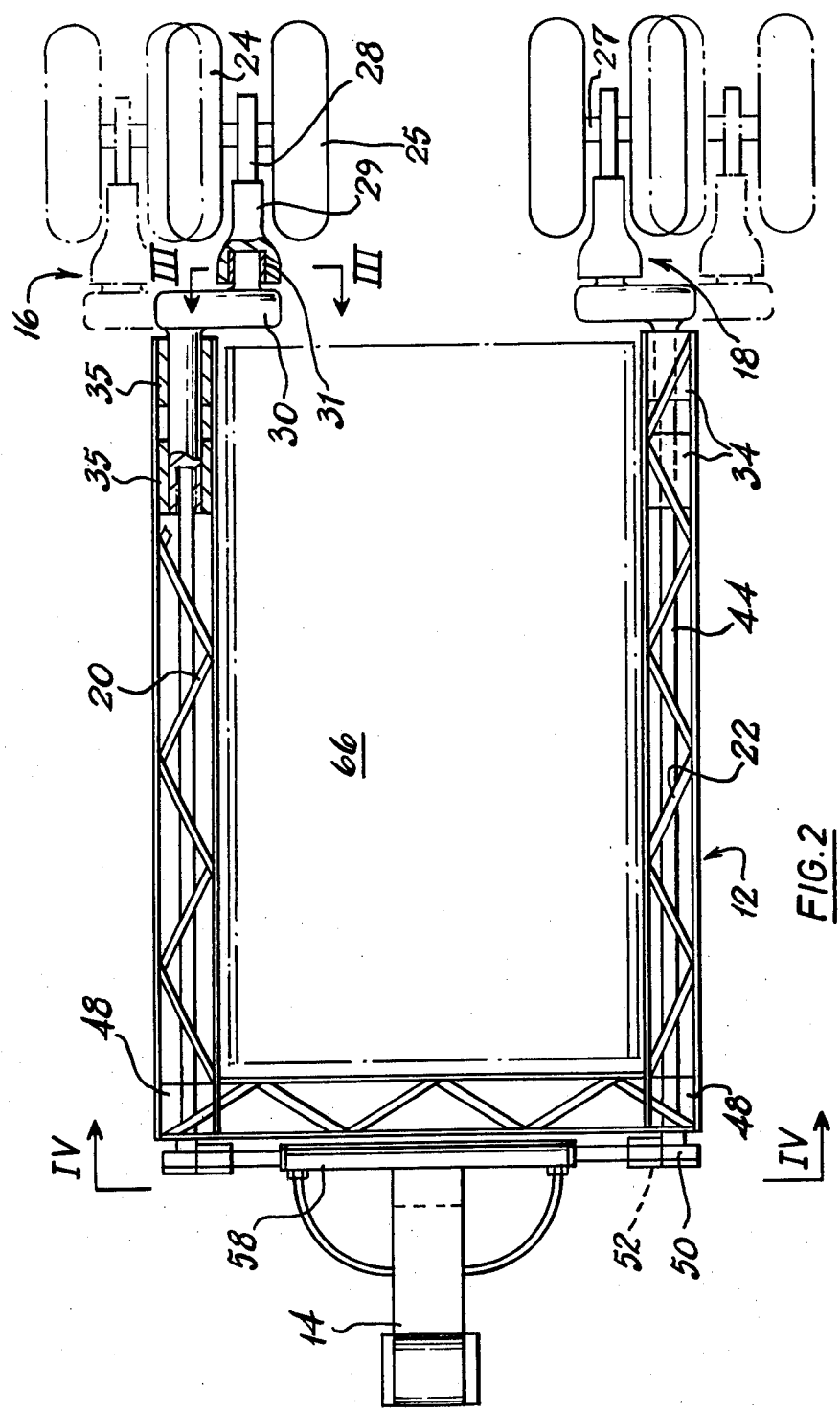
FIG. 2 is a plan view of the vehicle shown in FIG. 1.
Figure 3:
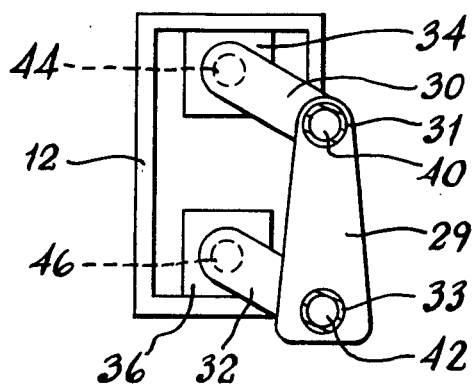
FIG. 3 is a view in the direction of the arrow III—III in FIG. 2 showing one wheel assembly.

The operation of the vehicle is as follows assuming that it is connected to a tractor vehicle, the frame 12 is unloaded and the wheel assemblies are in the position shown in full lines in FIG. 2. To prepare the vehicle to pick up the container 66 it is necessary to move the wheel assemblies 16, 18 transversely to the position indicated in chain dotted lines in FIG. 2. This is achieved by extending the hydraulic cylinder 58 whilst moving the vehicle along the ground so causing the links 50 and 51 to rotate and twist the torsion bars 44, 46. The torsion bars 44, 46 in turn rotate the cranks 30, 32 and move the wheel support bracket 29. Since the wheels 24, 25 are rotating during this movement they do not resist the transverse movement of the support bracket 29 and so the assemblies 16, 18 move to the position shown by dotted lines in FIG. 2 when the links 50 abut the stops 56. During this movement the frame 12 lifts and then lowers.

The vehicle may then be reversed toward the container 66 until the legs 20, 22 are alongside it. The load lifting device 60 is then operated to support the container clear of the ground. As the vehicle is moved forwards the hydraulic cylinder 58 is retracted to swing the wheel assemblies 16, 18 back to the position shown in full lines when the links 50 once again abuts the stops 56. The track of the vehicle is thus reduced to allow use on the public highway.

The torsion bars 44, 46 provide springing for the vehicle so that when loaded the cranks 30, 32 may occupy a horizontal disposition and will oscillate about this position.

It will be apparent that the torsion bars 44, 46 may be replaced by solid bars where springing is not required and that a pair of single acting hydraulic cylinders acting in opposite directions may be used where it is desirable to avoid placing the cylinder in a buckling condition.

Alternatively only one torsion bar may be provided, one of the links 30, 32 being pivoted directly on the frame.

Further the device may be applied to other forms of vehicle such as low loaders where the hydraulic cylinder may be situated beneath the floor of the vehicle adjacent the wheels. Conveniently the cranks 30 and 32 may be made to rotate through the opposite arc to that shown so that the frame 12 of the vehicle is first lowered then raised. The arrangement may be such as to lower the floor on to the ground thus allowing ready access. Also the wheel assemblies may consist of one wheel which need not be arranged to pivot about the longitudinal bearings on the wheel support bracket 29. The frame 12 has been shown in the present drawings as being of a lattice construction for the sake of showing the disposition of the torsion bars 44 and 46.

In practice it is possible to use both this lattice construction and a tubular construction without departing from the invention.

What we claim is:

1. A vehicle comprising a frame having a forward portion and two side portions, at least one support assembly attached to each side portion of the frame, each support assembly including at least one generally horizontal fore and aft extending torque shaft rotatably mounted on the frame, a crank arm secured to one end of the torque shaft, a wheel assembly pivotally attached to the crank arm and adjusting means to hold the torque shaft in one of at least two positions to position the wheel assembly laterally relative to the frame.

2. A vehicle according to claim 1 wherein each support assembly includes a second torque shaft rotatably mounted on the frame generally parallel to said fore and aft extending torque shaft, a second crank arm secured to one end of the second torque shaft and pivot means pivotally attaching the wheel assembly to the second crank arm.

3. A vehicle according to claim 2 wherein the two torque shafts are generally vertically spaced.

4. A vehicle according to claim 2 wherein the adjusting means positions both torque shafts.

5. A vehicle according to claim 2 wherein the adjusting means includes a hydraulic cylinder.

6. A vehicle according to claim 1 wherein the forward portion of the frame includes rigidly attached hitch frame adapted to be connected to a tractor.

7. A vehicle according to claim 1 wherein the frame is U-shaped and a wheel assembly is mounted at the end of each leg of the U.

8. A vehicle according to claim 1 wherein the torque shaft is resilient and allows movement of the wheel assembly relative to the frame.

9. A vehicle according to claim 2 wherein the two crank arms pivotally attached to the wheel assembly are substantially parallel to each other.

* * * * *